US009672541B2

(12) United States Patent
Smith (10) Patent No.: US 9,672,541 B2
(45) Date of Patent: Jun. 6, 2017

(54) VISUAL TAG EDITOR

(71) Applicant: Turn Inc., Redwood City, CA (US)

(72) Inventor: Douglas Smith, Orinda, CA (US)

(73) Assignee: Turn Inc., Redwood City, CA (US)

( * ) Notice: Subject to any disclaimer, the term of this patent is extended or adjusted under 35 U.S.C. 154(b) by 0 days.

(21) Appl. No.: 14/332,420

(22) Filed: Jul. 16, 2014

(65) Prior Publication Data

US 2016/0019600 A1    Jan. 21, 2016

(51) Int. Cl.
*G06F 17/24* (2006.01)
*G06Q 30/02* (2012.01)
*G06F 17/25* (2006.01)

(52) U.S. Cl.
CPC ..... *G06Q 30/0277* (2013.01); *G06Q 30/0201* (2013.01)

(58) Field of Classification Search
CPC .................................. G06F 17/2247
USPC ....................................... 715/234
See application file for complete search history.

(56) References Cited

U.S. PATENT DOCUMENTS

| 7,747,941 | B2* | 6/2010 | Campbell | G06F 17/243 |
| | | | | 715/234 |
| 2006/0123330 | A1* | 6/2006 | Horiuchi et al. | 715/500 |
| 2008/0120538 | A1* | 5/2008 | Kurz et al. | 715/255 |
| 2009/0132524 | A1* | 5/2009 | Stouffer et al. | 707/5 |
| 2009/0282062 | A1* | 11/2009 | Husic | 707/100 |
| 2011/0119220 | A1* | 5/2011 | Seolas et al. | 706/47 |
| 2012/0144291 | A1* | 6/2012 | Chang et al. | 715/234 |
| 2013/0339839 | A1* | 12/2013 | Baran et al. | 715/234 |
| 2014/0006930 | A1* | 1/2014 | Hollis et al. | 715/234 |
| 2014/0053060 | A1* | 2/2014 | Walker | G06F 17/2247 |
| | | | | 715/234 |
| 2014/0082479 | A1* | 3/2014 | Guinane | 715/234 |
| 2014/0304682 | A1* | 10/2014 | Taylor | G06F 9/45529 |
| | | | | 717/113 |
| 2015/0324863 | A1* | 11/2015 | Pugh | G06Q 30/0269 |
| | | | | 705/14.27 |

OTHER PUBLICATIONS

Costagliola et a., "A Framework for Modeling and Implementing Visual Notations With Applications to Software Engineering", ACM, 2004, pp. 431-487.*

* cited by examiner

*Primary Examiner* — James J Debrow
(74) *Attorney, Agent, or Firm* — Kwan & Olynick LLP (57) ABSTRACT

According to various embodiments, techniques and mechanisms described herein facilitate the editing of computer programming tags associated with a website. A user interface displaying a representation of a website may be presented on a display screen. The representation may include a plurality of webpage identifiers that each identifies a respective webpage associated with the website. The representation may also include a plurality of active tag indicators that are each associated with a respective one of the webpages. Each active tag indicator may identify a respective portion of computer programming code included in the respective webpage with which the active tag indicator is associated. User input indicating an editing action to be performed with respect to one or more of the computer programming code portions may be received, and a message identifying the editing action may be transmitted via a communications interface.

20 Claims, 5 Drawing Sheets

VISUAL TAG EDITOR

TECHNICAL FIELD

The present disclosure relates generally to online advertising opportunity configuration and more specifically to the visual presentation of advertising code portions configured for inclusion in a website.

DESCRIPTION OF RELATED ART

In online advertising, computing device users are presented with advertisements as they browse the internet using a web browser or use web-enabled applications. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are presented on a daily basis. Advertisers often try to use ad impressions to reach as many targeted users as possible. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

To facilitate the effect delivery of online advertisements and to collect information about advertising audience members, advertisers may include programming code portions on participating websites. Such code portions may be configured to present advertisements, collect information, or perform other advertising-related functions on a website. These portions may be assigned to individual webpages within a website, and different webpages may be assigned different code portions.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for editing of computer programming tags associated with a website. A user interface displaying a representation of a website may be presented on a display screen. The representation may include a plurality of webpage identifiers that each identifies a respective webpage associated with the website. The representation may also include a plurality of active tag indicators that are each associated with a respective one of the webpages. Each active tag indicator may identify a respective portion of computer programming code included in the respective webpage with which the active tag indicator is associated. User input indicating an editing action to be performed with respect to one or more of the computer programming code portions may be received, and a message identifying the editing action may be transmitted via a communications interface.

According to various embodiments, one of the computer programming code portions may be configured to collect information about visitors to the webpage in which the computer programming code portion is included. Alternately, or additionally, one of the computer programming code portions may be configured to present an advertisement when the webpage in which the computer programming code portion is included is loaded in a web browser.

In particular embodiments, the presentation of the website may be updated to reflect the editing action. The representation may include configured tag indicators that are each associated with a respective one of the webpages and that each identifies a respective portion of computer programming code selected for inclusion in the respective webpage with which the active tag indicator is associated.

In some implementations, the representation may include webpage analytics indicators that are each associated with a respective one of the webpages. Each webpage analytics indicator may describe one or more characteristics of web traffic associated with the respective webpage. The web traffic characteristics described by one or more of the webpage analytics indicators may include information identified by a first one of the computer programming code portions identified by the active tag indicators.

According to various embodiments, each webpage identifier may include a respective visual representation of the webpage associated with the webpage identifier when the webpage is rendered in a web browser. The representation may include information identifying a plurality of relationships between selected ones of the webpages.

In some embodiments, the editing action may include one or more of adding one or more of the computer programming code portions to one or more of the webpages, removing one or more of the computer programming code portions from one or more of the webpages, or altering one or more of the computer programming code portions.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular techniques and mechanisms related to advertising campaigns. However, it should be noted that the techniques and mechanisms of the present invention apply to a variety of different computing techniques and mechanisms. In the following description, numerous specific details are set forth in order to provide a thorough understanding of the present invention. Particular example embodiments of the present invention may be implemented without some or all of these specific details. In other instances, well known process operations have not been described in detail so as not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein facilitate the editing of tags associated with websites in a visual user interface. Each tag may correspond to a code portion assigned to a webpage within the website. For instance, a code portion may be configured to gather data about users who visit the page. A visual site map representation of a website may be created and presented in a user interface. The visual site map may represent different webpages within the website along with links between the webpages. The visual site map may also represent tags attached to the webpages. These tags may be analyzed, added, removed, changed, or otherwise viewed or edited within the user interface.

Example Embodiments

In recent years, the amount of advertisements served via a network such as the internet has experienced a tremendous growth. For instance, RTB exchanges provide a technology for advertisers to algorithmically place a bid on any individual impression through a public auction. Advertising functionality allows advertisers to buy inventory in a cost effective manner and to serve ads to the right person in the right context at the right time. However, in order to realize such functionality, advertisers need to intelligently evaluate the audience to which advertisements are provided.

The placement of online advertisements may be facilitated by advertisement management systems that connect advertisers with an advertisement audience. For example, an advertisement management system may place advertisements on websites viewable via a web browser. As another example, an advertisement management system may place advertisements for presentation in network-connected applications such as mobile applications.

In order to place advertisements effectively, advertisements may be targeted based on audience. Audience targeting may involve identifying and describing one or more characteristics associated with an audience. For instance, demographic information, advertisement viewing information, and/or product purchasing information associated with an audience may be collected and aggregated to identify an audience for advertisement placement.

According to various embodiments, techniques and mechanisms described herein facilitate the editing of tags associated with websites in a visual user interface. Page inventory in a tag management system may be used to select websites to map. A selected website may be mapped to determine visual tag information. The visual tag information, which may include information about both the structure of the website and the tags assigned to different pages within the website, may be presented in a user interface.

In some embodiments, a tag may be attached to a webpage for various purposes, such as for gathering information about users of the webpage. For instance, a website owner may assign to a webpage standard "beacon" tags that include Javascript code portions or HTML IMG tags. When a user visits the webpage, the code included with these tags may collect information about the user. For example, the code may collect information related to a user's address, purchases, actions, or characteristics.

In some implementations, within the user interface a user may visually notice which pages have tags attached, may identify the function of the tags at a glance, and may edit the tags. The user may also compare the performance of different webpages within the website, for instance to facilitate tag editing decisions. For instance, performance data from a website may be gathered to generate insights and analytics. Then, performance information may be presented in the visual tag editor to allow a user to view the performance information alongside the editable tags that are also displayed in the editor.

In some embodiments, a user may use the visual tag editor to edit tags. For instance, the user may select a webpage within the website displayed in the visual tag editor and load the webpage into a web browser. Then, the user may employ a page editing tool such as the FlexTag inspector available from Turn Inc. of Redwood City, Calif., to add, remove, or alter tags in association with webpage components.

According to various embodiments, the visual tag editor may display one or both of tags that have been configured to be attached to particular webpages and tags that are actually attached to particular webpages. For instance, a website administrator may provide user input indicating that a tag should be attached to a particular webpage. However, updating the website to include the configured tag may take time. Accordingly, the visual tag editor may present website information drawn both from configuration information associated with the website and from an active mapping of the live website. In this way, the user can view both the tags assigned to particular webpages as well as the tags that are actually included in the pages.

In particular embodiments, a user may view third party tags in the visual tag editor. For instance, a website administrator may use the visual tag editor to add, edit, and remove tags related to advertising audience data collection and management. The website administrator may also add different types of tags for other purposes, for instance via different tag management systems. The visual tag editor may present these third party tags along with the tags actively managed by the system associated with the visual tag editor.

In some implementations, a visual tag editor may provide a visual view of a website at which user behavior is captured. The tag management system may thus be synchronized with the active website, which may provide a user of the system with confidence and comprehension regarding his or her tag editing actions. For example, the visual tag editor may provide an intuitive and easy way to add, edit, and view advertising analytics information alongside webpage inventory information. As another example, the visual tag editor may provide an opportunity to present comparative analytics between and among webpages in a visual way. For instance, webpages may be compared in terms of traffic, conversions, or other relevant metrics.

According to various embodiments, a visual tag editor may facilitate efficient tag management by connecting the creation and maintenance of tags to the actual sites where they are utilized. For instance, a visual tag editor may facilitate performing a comparison between different webpages on a website to determine where advertisements might be most effective. In some instances, a visual tag editor may provide a visual representation of a website that may facilitate a better understanding of both the website structure and the data gathering object infrastructure for the website.

Figure 1:
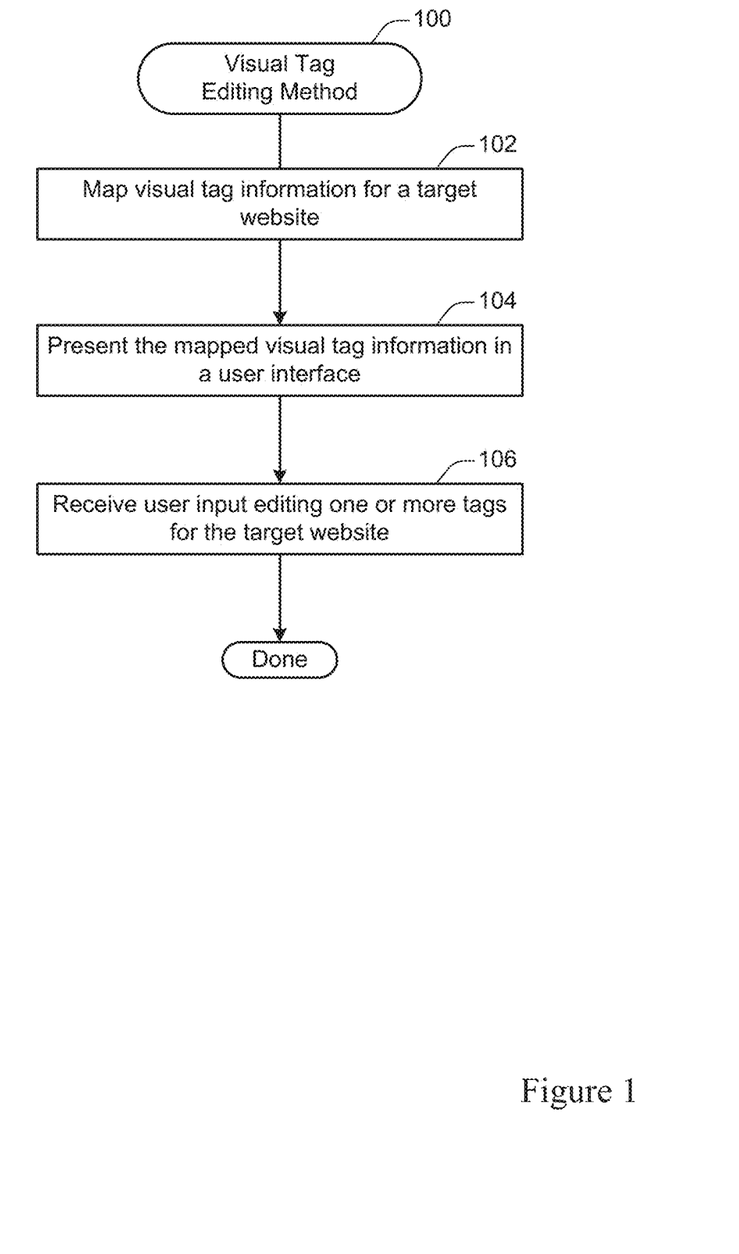
FIG. 1 illustrates an example of a visual tag editing method, performed in accordance with one or more embodiments.

FIG. 1 illustrates an example of a visual tag editing method 100, performed in accordance with one or more embodiments. According to various embodiments, the method 100 may be performed at a computing device in communication with a tag management system. The computing device may be used by a website administrator, advertising campaign manager, or other individual to analyze, display, and edit tags associated with a website.

At 102, visual information for a target website is mapped. According to various embodiments, mapping visual tag information for a target website may involve one or more techniques for collecting and arranging information describing the configuration of the target website. For example, a web crawler may crawl the target website in order to identify webpages within the website as well as links or relationships between the webpages. As another example, a webpage analysis tool may analyze crawled webpages to identify tags that are included within the webpages. As yet another example, data may be retrieved from a website tag management system to determine which tags have been designated for inclusion on which webpages. As still another example, analytics data associated with one or more of the webpages may be retrieved from a webpage analytics system. Techniques for mapping visual tag information for a target website are discussed in further detail with respect to the method 200 shown in FIG. 2.

At 104, the mapped visual tag information is presented in a user interface. According to various embodiments, presenting the mapped visual tag information may include various operations associated with constructing a user interface and arranging within the user interface the information identified at operation 102. For example, relationships between the webpages may be determined Then, the webpages may be arranged within the interface in such a way that the relationships are reflected. Information identifying tags associated with the webpages may be presented in association with the webpages. The information may indicate whether each tag is configured, active, or both. Alternately, or additionally, analytics information may be presented in association with a webpage that indicates, for example, characteristics associated with traffic received by the webpage. Techniques for presenting mapped visual tag information in a user interface are discussed in further detail with respect to the method 300 shown in FIG. 3.

Figure 3:
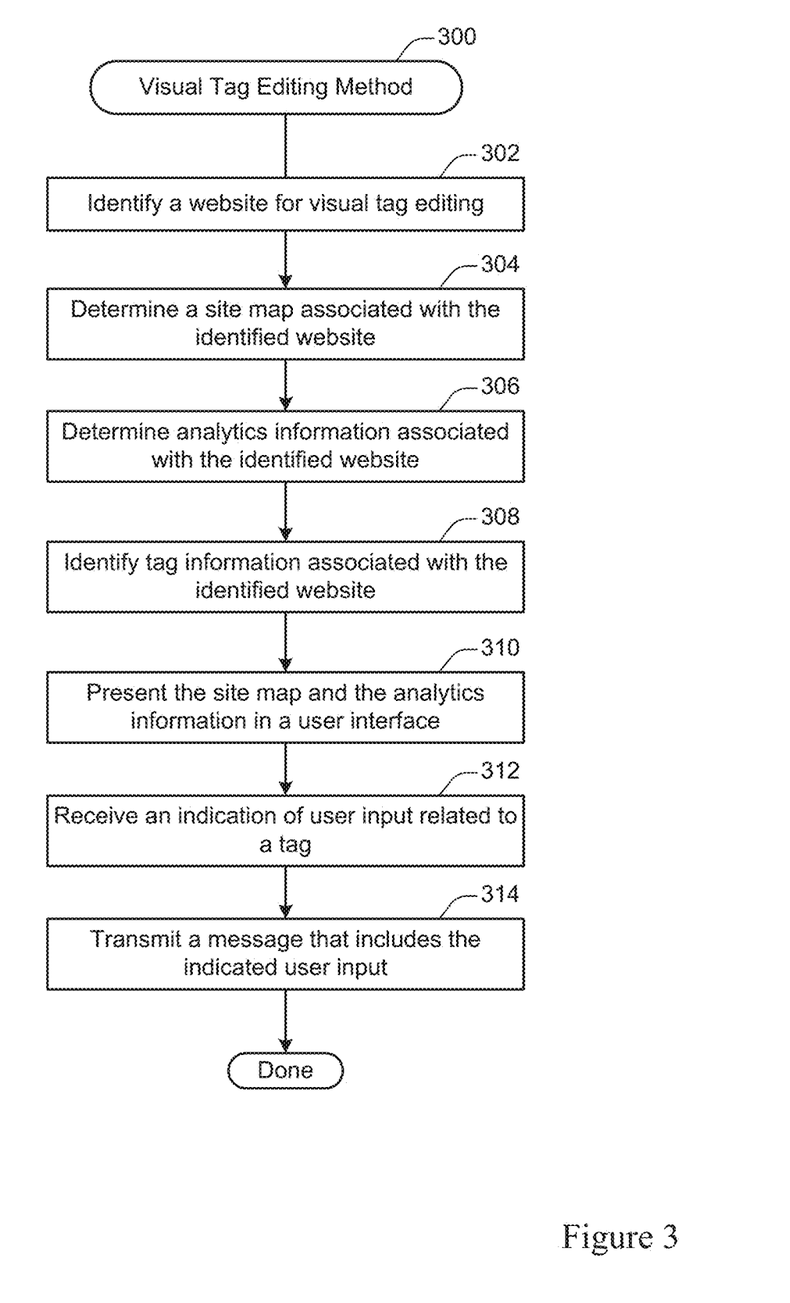
FIG. 3 illustrates an example of a visual tag presentation method, performed in accordance with one or more embodiments.

At 106, user input editing one or more tags for the target website is received. In some embodiments, user input may be used to adjust any of various tag-related properties. For example, user input may be used to add a new tag with a webpage included within the website. The tag may be new to the website as a whole or instead may be new to the webpage to which it is assigned. As another example, user input may be used to remove a tag from a webpage. As yet another example, user input may be used to alter a tag associated with a webpage. For instance, computer programming code associated with the tag may be modified. FIG. 3 also discusses various techniques for editing tags.

Figure 2:
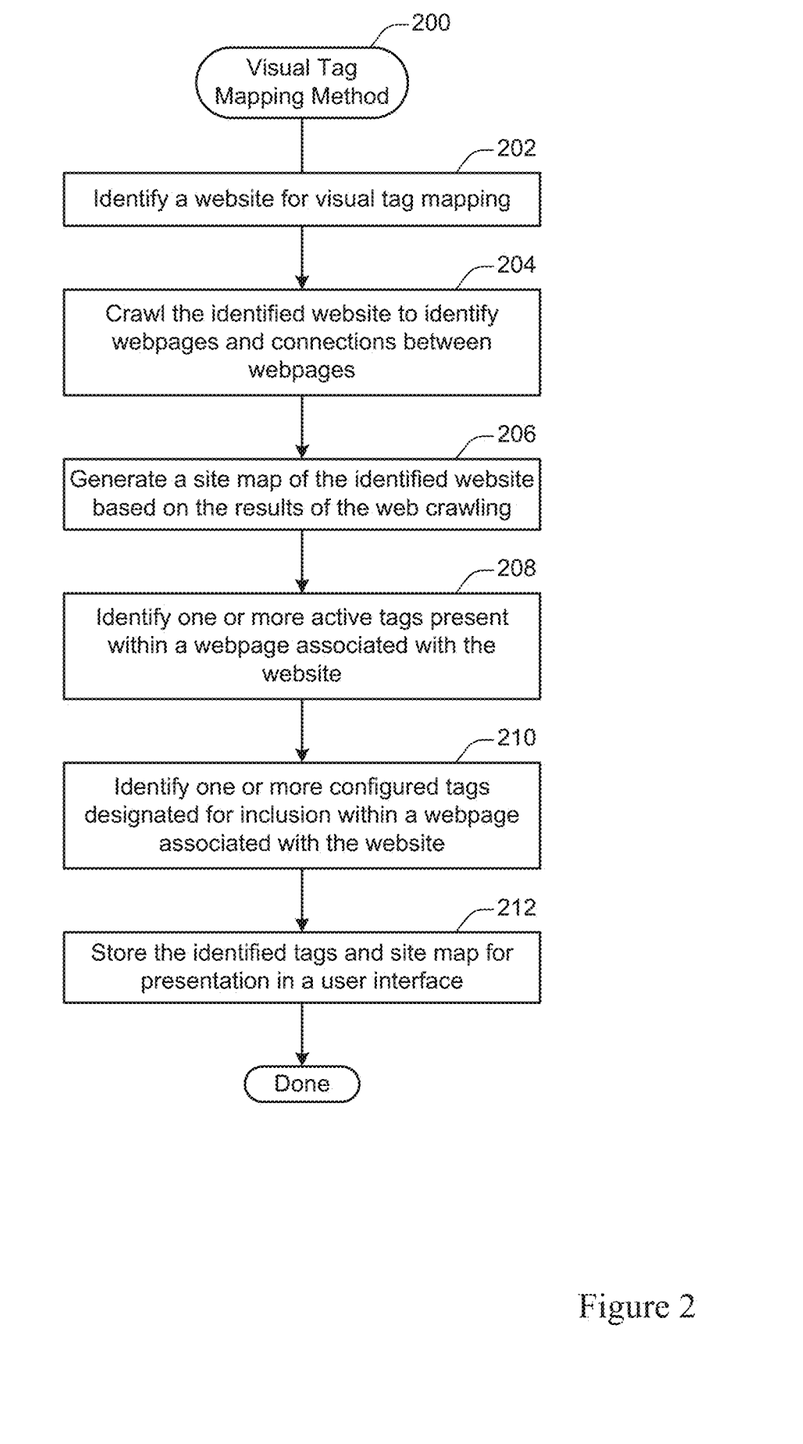
FIG. 2 illustrates an example of a visual tag mapping method, performed in accordance with one or more embodiments.

FIG. 2 illustrates an example of a visual tag mapping method 200, performed in accordance with one or more embodiments. The method 200 may be performed in order to collect various types of information related to a website. For instance, the method 200 may be performed in order to identify webpages within a website, links within those webpages, tags included within those webpages, and/or analytics information describing web traffic received by those webpages.

Figure 4:
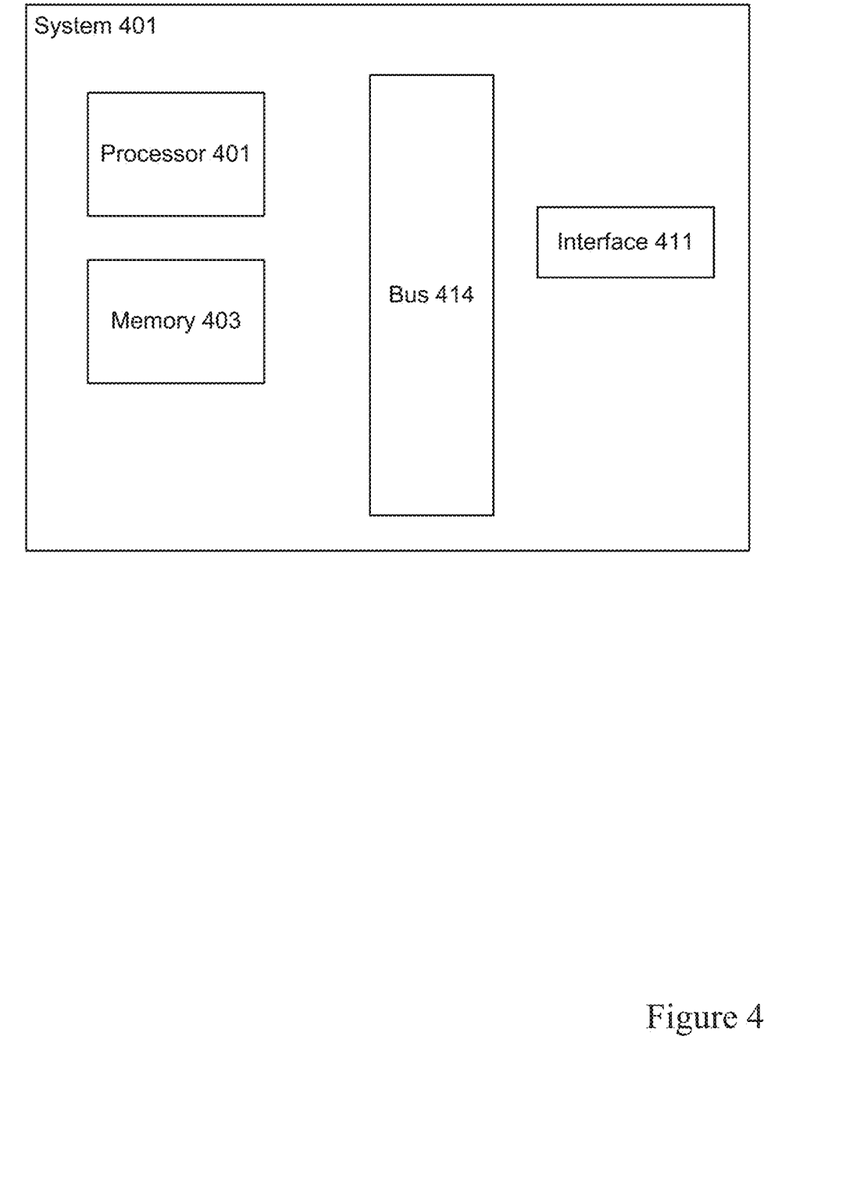
FIG. 4 illustrates an example of a computing device, configured in accordance with one or more embodiments.

In some embodiments, the method 200 may be performed at a computing device in communication with a tag management system. An example of such a computing device is shown in FIG. 4.

At 202, a website is identified for visual tag mapping. According to various embodiments, a website may be identified for visual tag mapping in any of various ways. For example, websites that are linked with a tag management system for the purpose of adding tags to the website may be crawled periodically, such as on a daily basis. As another example, a website may be identified via user input. An example of a user interface affordance that allows a user to provide user input identifying a website is shown at 504 in FIG. 5.

At 204, the identified website is crawled to identify webpages and connections between the webpages. According to various embodiments, different techniques may be used to crawl the website. For instance, a tag management system may include a web crawler configured to crawl websites to identify information relevant to the tag management system. Crawling the website may involve collecting information that includes, but is not limited to: URLs associated with webpages, names or identifiers for webpages, content included on webpages, computer programming code or markup used to render webpages, relationships such as hyperlinks between webpages, and visual representations of rendered webpages.

Figure 5:
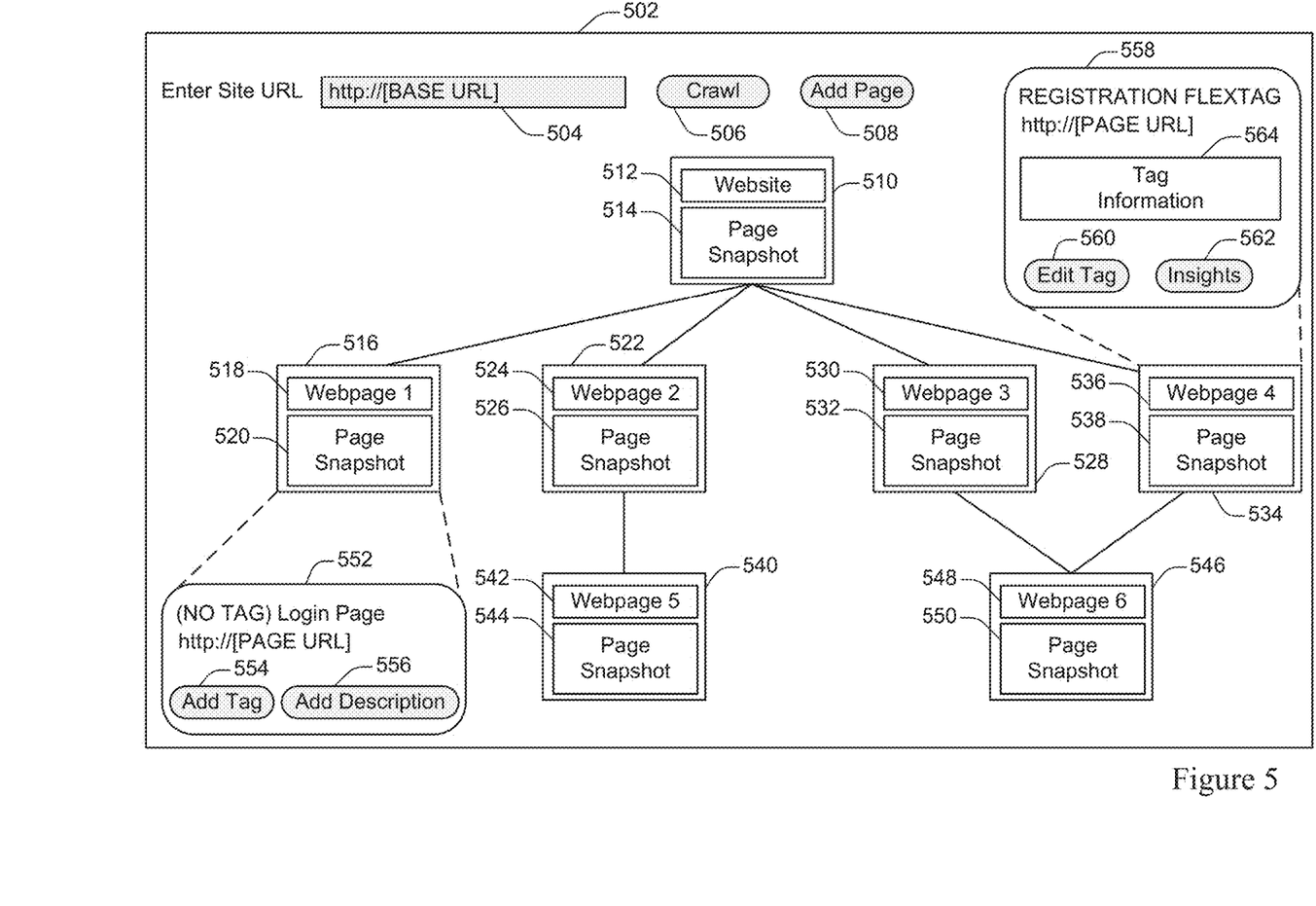
FIG. 5 illustrate a diagram of a user interface that may be presented in accordance with one or more embodiments.

At 206, a site map of the identified website is generated based on the results of the web crawling. According to various embodiments, the site map may be generated by connecting information describing webpages associated with the website with relationship information linking the different webpages. For instance, each webpage may be associated with descriptive information such as a URL, a page name or identifier, and a snapshot of the webpage. This information may be included within an indicator associated with the webpage. Then, relationships between the webpages may be analyzed and arranged to facilitate a visual representation of the website. For instance, webpages that are directly connected to the base URL may be designated as belonging to one category, while webpages that are indirectly connected to the base URL may be designated as belonging to another category. These categorizations may be used to present the webpages in a visually appealing and sensible fashion, as shown in FIG. 5.

At 208, one or more active tags present within a webpage associated with the website are identified. According to various embodiments, the active tags may be identified by analyzing computer programming code or markup used to render webpages associated with the website. For instance, a webpage is typically rendered by receiving computing programming code and/or markup from a server. This markup and/or code may be analyzed to identify any tags contained therein. Tags may be identified by isolating tag-specific identifiers within the code and/or markup. Then, information characterizing the active tag may be extracted from the code and/or markup.

According to various embodiments, tags may be used to perform actions such as displaying advertisements or collecting information. For instance, tags may collect information which may include, but is not limited to: demographics information about users visiting a webpage, information entered via user input into a webpage, information stored in a web cookie associated with a web page, the value of items in a shopping cart used to collect items for purchase via the webpage, or any other data that may be generated when a user visit the webpage.

At 210, one or more configured tags designated for inclusion within a webpage associated with the website are identified. According to various embodiments, a tag may be designated for inclusion within a webpage and may or may not actually be present within the active webpage. For instance, the active webpage may have not yet been altered to include the tag designated for inclusion. The one or more configured tags may be identified by requesting configured tag information from a tag management system.

At 212, the identified tags and site map are stored for presentation in a user interface. According to various embodiments, the tags and site map may be presented in a user interface as discussed with respect to the method 300 shown in FIG. 3 and as shown in the example user interface in FIG. 5. Storing the tags and site map may include, for instance, writing the data describing the tags and site map to memory for subsequent retrieval.

FIG. 3 illustrates an example of a visual tag presentation method 300, performed in accordance with one or more embodiments. The method 300 may be performed in order to present and edit various types of information related to a website. For instance, the method 300 may be performed in order to display information identified in the method 200 shown in FIG. 2. Once the information is displayed, properties such as characteristics related to the tags included in the webpages may be altered, added, or removed.

In some embodiments, the method 300 may be performed at a computing device in communication with a tag management system. An example of such a computing device is shown in FIG. 4.

At 302, a website is identified for visual tag editing. According to various embodiments, a website may be identified for visual tag mapping in any of various ways. For instance, a website may be identified via user input. An example of a user interface affordance that allows a user to provide user input identifying a website is shown at 504 in FIG. 5.

At 304, a site map associated with the identified website is determined According to various embodiments, the sitemap may be determined as discussed with respect to the operation 206 shown in FIG. 2. The sitemap may include information such as indicators associated with webpages within the website, relationship information describing relationships between the webpages, and other such data.

At 306, analytics information associated with the identified website is determined. In some embodiments, analytics information may be determined by retrieving the analytics information from an advertising management system. For instance, the advertising management system may provide advertising-related services such as advertisement placement, web traffic analysis, and tag management for the website. The analytics information may be retrieved from the advertising management system by transmitting a message to the advertising management system identifying the website.

At 308, tag information associated with the identified website is identified. According to various embodiments, the tag information may be identified as discussed with respect to operations 208 and 210 shown in FIG. 2. The tag information may include information characterizing active tags and/or configured tags.

At 310, the site map, the analytics information, and the tag information are presented in a user interface. According to various embodiments, various user interfaces consistent with the techniques and mechanisms discussed herein may be employed to present the site map, the tag information, and the analytics information. An example of such a user interface is shown in FIG. 5.

At 312, an indication of user input related to the tag is received. According to various embodiments, the user input may include any input indicating a request to add, remove, or alter a tag. For example, the user input may indicate a request to add to a web page a new tag or a tag associated with a different webpage. As another example, the user input may indicate a request to remove a tag from a webpage. As yet another example, the user input may indicate a request to alter a tag. The types of user input related to tag alteration that may be received may include, but are not limited to, altering a tag key that identifies the tag, altering an event name that triggers programming code associated with the tag, altering a variable or selector from which to collect data, altering a data type associated with the data collected, and/or altering a post-processing procedure for performing on collected data.

According to various embodiments, a post-processing procedure may allow computer programming code to analyze information collected via a tag before it is transmitted to a server. In some instances, such analysis may help to protect privacy, reduce data volume, categorize data that is collected, and/or provide other such benefits. For example, a tag may collect a dollar value indicating an amount of money associated with purchases in a shopping cart included in a webpage. The tag may include a pre-processing procedure that categorizes the dollar value into "high", "medium", and "low" based on threshold values. Such categorization may help to provide useful analytics information for advertising purposes without sending the exact dollar value of a user's purchases to an advertiser.

At 314, a message that includes the indicated user input is transmitted. According to various embodiments, the message may be transmitted to different recipients depending on factors such as the configuration of the system and the location of the computing system on which the method 300 is performed. For example, the message may be transmitted to a server configured to provide tag management services. For instance, the server may initiate an alteration in the tag management configuration administered by the server based on the user input. As another example, the message may be transmitted to a storage medium at the computing device configured to store user input. For instance, user input may be stored for updating the representation displayed in the user interface.

FIG. 4 illustrates one example of a computing device. According to particular embodiments, a system 400 suitable for implementing particular embodiments of the present invention includes a processor 401, a memory 403, an interface 411, and a bus 415 (e.g., a PCI bus or other interconnection fabric) and operates as server, client device, or any other device or service described herein. Various specially configured devices can also be used in place of a processor 401 or in addition to processor 401. The interface 411 is typically configured to send and receive data packets over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular computing device is described, it should be recognized that a variety of alternative configurations are possible.

FIG. 5 illustrate a diagram of a user interface 502 that may be presented in accordance with one or more embodiments. For instance, the user interface 502 may be presented at a computing device in communication with a tag management system system. It should be noted that the user interface shown in FIG. 5 is only one example of the types of user interfaces capable of being presented in accordance with the techniques and mechanisms described herein, and that many other arrangements of user interfaces displaying the same or similar information are possible.

The user interface 502 includes a URL window 504. According to various embodiments, the URL window may be used to load a website into the user interface. For instance, a user may type in a base URL corresponding to a website or portion of a website. Then, the user may activate the "Crawl Button" 506. When the crawl button is activated, the website may be mapped as discussed with respect to the method 200 shown in FIG. 2.

In some embodiments, as discussed with respect to the method 200, a website may be crawled beginning with a base URL. Various levels of websites may be regarded as a base URL, including a domain, a subdomain, or a webpage within a website.

The user interface 502 also includes an "Add Page" button 508. According to various embodiments, the add page button may allow a user to manually add a particular webpage to the representation presented in the user interface. For example, in a complicated website the user interface may be configured to present a subset of the webpages associated with the website. As another example, the procedure for mapping the website may omit a webpage that the user would like to include, such as an interrelated webpage hosted under a different domain or subdomain. In these examples, if a user would like to add an additional webpage to the representation, the user may be able to navigate to the additional webpage and add it manually using the add page button 508.

The user interface 502 includes various webpage indicators, including the webpage indicators 510, 516, 522, 530, 534, 540, and 546. Each of the webpage indicators corresponds to a respective webpage. For example, the webpage indicator 510 corresponds with the base website that was mapped or crawled. As another example, the webpage indicators 516, 522, 530, 534, 540, and 546 correspond with different webpages associated with the crawled website.

According to various embodiments, a webpage indicator may include a webpage identifier. For instance, the aforementioned webpage indicators are presented in conjunction with the website identifiers 512, 518, 524, 532, 536, 542, and 548. Each webpage identifier may identify a webpage. For instance, a webpage identifier may be a title or a URL associated with the webpage.

In some embodiments, a webpage represented in the user interface may or may not be uniquely identified by a URL. For instance, in relatively static websites, different webpages may be accessed via distinct URLs. However, in relatively dynamic websites, the same URL may be used to access substantially different content.

According to various embodiments, a webpage indicator may include a page snapshot. For instance, the aforementioned webpage indicators are presented in conjunction with the page snapshots 514, 520, 526, 534, 538, 544, and 550. Each page snapshot may serve as a thumbnail view of the webpage associated with the webpage indicator. For instance, the page snapshot 520 may provide a small image of the webpage associated with the webpage indicator 516 and identified by the webpage identifier 518.

In some implementations, a user interface may include information indicating relationships or hierarchies amongst different webpages associated with a website. For instance, in FIG. 5, each of the webpage indicators 516, 522, 530, and 536 are associated with webpages that are directly connected with the base website indicated by the webpage indicator 510. Similarly, the webpage indicator 522 is directly linked with the webpage indicator 540, and the webpage indicator 546 is directly linked with the webpage indicators 528 and 534.

According to various embodiments, links between different webpage indicators may carry different types of meaning. For example, a link may indicate a unidirectional or bidirectional connection between two webpages via hyperlink. As another example, a link may represent a commonly traveled connection. For instance, a navigation bar may provide common access to many pages within a website, but users may tend to follow particular pathways when navigating the website. In this case, links may be determined by web traffic information such as webpage analytics indicating commonly chosen actions.

In some embodiments, a user interface may include a tag indicator. For instance, the user interface 502 includes the tag indicators 552 and 558. Each of the tag indicators may provide information about one or more tags associated with a webpage. In some instances, tag indicators may be activated or deactivated upon request. For instance, a user may click the webpage indicator 516 to display or hide the tag indicator 552. A tag indicator may be displayed as an overlay that is presented on top of other information presented in the user interface or may be displayed separately from the other information, as shown in FIG. 5.

According to various embodiments, each tag indicator may display various types of information and user interface affordances. For example, the tag indicator 552 includes an indication that the webpage 518 is not associated with a tag. As another example, the tag indicator 552 also includes an identifier, "Login Page", that describes the function of the webpage 518. As yet another example, the tag indicator 552 includes a URL for accessing the webpage 518. As still another example, the tag indicator 552 includes the buttons 554 and 556.

In some embodiments, buttons presented within a tag indicator may allow a user to take various actions related to a webpage. For example, in the tag indicator 552, the "Add Tag" button 554 may allow the user to add a tag to the webpage 518. The tag may be an entirely new tag or may be a new copy of an existing tag already in use with another webpage. Various techniques may be used to add a tag if the button 554 is activated. For instance, a tag may be added in conjunction with a tag management system such as the one provided by Turn Inc., located in Redwood City, Calif.

As another example of a button, the "Add Description" button 556 may be used to add descriptive material related to the webpage 518. This descriptive material may assist in understanding and analyzing the website 512. For instance, the descriptive material may describe the webpage 518, may identify one or more reasons for why the webpage 518 does not have a tag, or may be used to edit an identifier for the webpage 518. The descriptive material and/or tag added via the buttons 554 and 556 may be stored on a storage medium so that in the event that the website 512 is crawled again, the descriptive material and/or the tag may be retrieved and presented in conjunction with the content determined by crawling the website 512.

The tag indicator 558 serves as another example of the types of information that may be presented within a user interface. The tag indicator includes a URL for accessing the webpage 536. The tag indicator 558 also includes an indication that the webpage 536 includes the "REGISTRATION FLEXTAG" tag. The Registration Flextag is a standard tag employed by the tag management system provided by Turn Inc. for use in a registration webpage. The Registration Flextag may be used to interact with the Flextag system for tag management. However, as discussed herein, various types of tags may be included within webpages. For instance, different tag management systems may be used.

The tag indicator 558 also includes the "Edit Tag" button 560. According to various embodiments, an edit tag button may allow a user to perform one or more actions related to a tag already associated with a webpage. For instance, the user may add a tag, remove a tag, or alter a tag. Various techniques may be used to edit a tag if the button 558 is activated. For instance, a tag may be edited in conjunction with a tag management system such as the one provided by Turn Inc., located in Redwood City, Calif.

The tag indicator 558 also includes the "Insights" button 562. According to various embodiments, the insights button 562 may be used to present information associated with the tag indicated by the tag indicator 558. For instance, the insights button 562 may load a user interface portion that displays analytics information captured by the tag. For example, the analytics information may be presented in a data visualization view that shows, for instance, that 75% of users of the webpage are male.

The tag indicator 558 includes a tag information portion 564. The tag information portion 564 may display tag information associated with the webpage 536 and/or the tag identified by the tag indicator 558. For example, the tag information portion 564 may display analytics data collected by the computer programming code associated with the tag, such as effective cost per action (eCPA). As another example, the tag information portion 564 may display descriptive information associated with the tag. For instance, the tag information portion 564 may display a tag key or identifier, an event name associated with the triggering of the tag, a selector or variable associated with the triggering event, a tag attribute type, and/or a transformation to perform on the collected data.

In one example, the tag information portion 564 displays the key as "RegisterSubmit", the event name as "RegisterSubmit", the Selector/Variable as ZipCode, the Attribute as Text, and the Transform as None. In this example, the tag is configured to collect zip code information as text input. The collection is configured to be performed when it is detected that the submit button has been pressed. The data is configured to be collected "as is" and not altered by a transformation of any sort. However, the preceding example is only one type of tag that may be associated with a webpage. As discussed herein, various types of tags may be employed.

According to various embodiments, the tag management techniques and mechanisms shown and discussed herein may be used in an online format. For instance, a live webpage may be crawled and visualized. Then, changes made to the tags associated with the live webpage may be made directly to the active webpage being served by a webserver. Alternately, or additionally, the tag management techniques and mechanisms shown and discussed herein may be used in an offline format. For instance, a live or offline webpage may be crawled and visualized. Then, changes made to the tags associated with the webpage may be stored for later addition to the active webpage. Such changes may need to be added or implemented by an administrator who possesses sufficient permission to access and edit the webpage.

According to various embodiments, as discussed herein, the tags indicated in a user interface in which a representation of a website is presented may include active tags, configured tags, or both. Active tags include tags discovered via mapping of an active website. Configured tags include tags selected for inclusion in a website, for instance via a tag management system. Any given tag may be active, configured, or both. For example, a tag may be selected for inclusion in a website and then actually included in the website, for instance by a website administrator. As another example, a tag that has been selected for removal from a website may remain within the active website for a time before it is actually removed even though the tag is no longer configured for inclusion in the website. As yet another example, a tag that has been configured for inclusion in a website may not yet be actually added to the active website. In particular embodiments, by presenting active tags, configured tags, or both, a user may be presented with a representation of a website that more fully reflects the interaction between the website and the tag management system.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
   presenting a user interface on a display screen communicably coupled with a computing device that includes memory and a processor, the user interface displaying a graphical representation of a website that includes a plurality of webpages, the representation including a plurality of graphical webpage snapshots that each depicts a respective webpage associated with the website, the representation further including a plurality of graphical indicators that illustrate links between the plurality of webpages, the representation further including a plurality of active tag indicators that are each associated with a respective one of the webpages, each active tag indicator being associated with a respective portion of computer programming code that is configured to collect data from visitors to the associated webpage and included in the respective webpage with which the active tag indicator is associated, wherein the representation further includes a plurality of webpage analytics indicators that are each associated with a respective one of the webpages and are each associated and selectable with at least one of the associated webpage's active tag indicators, each of the webpage analytics indicators, upon selection, describing one or more characteristics of the collected data associated with the respective webpage and it's at least one active tag indicator;

receiving user input indicating an editing action to be performed with respect to a first one of the computer programming code portions associated with a first one of the active tag indicators and its associated webpage and that will present an advertisement when the associated webpage in which the first computer programming code portion is included is loaded in a web browser, the editing action adding the first computer programming code portion to or removing the first computer programming code portion from the webpage, wherein the webpage analytics indicator that is associated with the first active tag indicator is configured to describe one or more characteristics of web traffic associated with the first active tag indicator based on traffic results obtained after the website is updated to reflect the editing action; and transmitting an update instruction message via a communications interface, the update instruction message including instructions for updating the website to reflect the editing action.

2. The method recited claim 1, wherein at least one of the webpage analytics indicators is configured to present a comparison of data collected about visitors to the associated webpage and data collected by a different one or more of the web pages upon selection of such webpage analytics indicator.

3. The method recited in claim 1, wherein the representation further includes a plurality of configured tag indicators that are each associated with a respective one of the webpages, each configured tag indicator being associated with a respective portion of computer programming code selected for inclusion in the respective webpage with which the first active tag indicator is associated, wherein at least one of the configured tag indicators is not active in that the associated computer programming code portion is not executed for the associated webpage when such associated webpage is viewed, wherein each configured or active tag indicator includes a visual display of a status of active or inactive.

4. The method recited in claim 1, wherein the active tag indicators are overlaid on top of their respective graphical webpage snapshots.

5. The method recited in claim 1, wherein each webpage snapshot includes a respective visual thumbnail view of the webpage depicting how such webpage is presented when the webpage is rendered in a web browser.

6. The method recited in claim 1, wherein the representation includes information identifying a plurality of relationships between selected ones of the webpages, wherein the relationships include indicators for the links that specify whether each associated link is bidirectional or unidirectional or whether such associated link is a commonly traveled link.

7. The method recited in claim 1, wherein the editing action includes removing or altering the first computer programming code portion associated with the first active tag indicator.

8. The method recited in claim 7, wherein altering the first computer programming code portion associated with the first active tag indicator includes selection of one or more of the following: altering an event name that triggers execution of the first computer programming code portion when the associated webpage is rendered, altering a variable or selector from which to collect data during execution of such first computer programming code portion when the associated webpage is rendered, and/or altering a post-processing procedure for the collected data during execution of such first computer programming code portion when the associated webpage is rendered.

9. The method of claim 8, wherein the editing action includes the post-processing procedure, which includes analyzing the collected data for such first computer programming code portion, and wherein such analyzing includes protecting the privacy of users of the associated webpage, reducing an amount of the collected data, and/or categorizing the collected data.

10. The method recited in claim 1, wherein each active tag indicator specifies a tag identifier, an event name that triggers execution of the associated computer programming code portion when the associated webpage is rendered, a variable or selector from which to collect data during execution of such associated computer programming code portion when the associated webpage is rendered, and a post-processing procedure, if any, for execution on the collected data.

11. A system comprising:

a display screen operable to present a user interface displaying a graphical representation of a website that includes a plurality of webpages, the representation including a plurality of graphical webpage snapshots that each depicts a respective webpage associated with the website, the representation further including a plurality of graphical indicators that illustrate links between the plurality of webpages, the representation further including a plurality of active tag indicators that are each associated with a respective one of the webpages, each active tag indicator being associated with a respective portion of computer programming code that is configured to collect data from visitors to the associated webpage and included in the respective webpage with which the active tag indicator is associated, wherein the representation further includes a plurality of webpage analytics indicators that are each associated with a respective one of the webpages and are each associated and selectable with at least one of the associated webpage's active tag indicators, each of the webpage analytics indicators, upon selection, describing one or more characteristics of web traffic associated with the respective webpage and it's at least one active tag indicator;

a user input device operable to receive user input indicating an editing action to be performed with respect to a first one of the computer programming code portions associated with a first one of the active tag indicators and its associated webpage and that will present an advertisement when the associated webpage in which the first computer programming code portion is included is loaded in a web browser, the editing action adding the first computer programming code portion to or removing the first computer programming code portion from the webpage, wherein the webpage analytics indicator that is associated with the first active tag indicator is configured to describe one or more characteristics of web traffic associated with the first active tag indicator based on traffic results obtained after the website is updated to reflect the editing action; and a communications interface operable to transmit an update instruction message via a communications interface, the update instruction message including instructions for updating the website to reflect the editing action.

12. The system recited in claim 11, wherein at least one of the webpage analytics indicators is configured to present a comparison of data collected about visitors to the associated webpage and data collected by a different one or more of the web pages upon selection of such webpage analytics indicator.

13. The system recited in claim 11, wherein the representation further includes a plurality of configured tag indicators that are each associated with a respective one of the webpages, each configured tag indicator being associated with a respective portion of computer programming code selected for inclusion in the respective webpage with which the first active tag indicator is associated, wherein at least one of the configured tag indicators is not active in that the associated computer programming code portion is not executed for the associated webpage when such associated webpage is viewed, wherein each configured or active tag indicator includes a visual display of a status of active or inactive.

14. The system recited in claim 11, wherein the active tag indicators are overlaid on top of their respective graphical webpage snapshots.

15. The system recited in claim 11, wherein each webpage snapshot includes a respective visual thumbnail view of the webpage depicting how such webpage is presented when the webpage is rendered in a web browser.

16. The system recited in claim 11, wherein the representation includes information identifying a plurality of relationships between selected ones of the webpages, wherein the relationships include indicators for the links that specify whether each associated link is bidirectional or unidirectional or whether such associated link is a commonly traveled link.

17. The system recited in claim 11, wherein the editing action includes altering the first computer programming code portion associated with the first active tag indicator, wherein altering the first computer programming code portion associated with the first active tag indicator includes selection of one or more of the following: altering an event name that triggers execution of the first computer programming code portion when the associated webpage is rendered, altering a variable or selector from which to collect data during execution of such first computer programming code portion when the associated webpage is rendered, and/or altering a post-processing procedure for the collected data during execution of such first computer programming code portion when the associated webpage is rendered.

18. The system of claim 17, wherein the editing action includes the post-processing procedure, which includes analyzing the collected data for such first computer programming code portion, and wherein such analyzing includes protecting the privacy of users of the associated webpage, reducing an amount of the collected data, and/or categorizing the collected data.

19. The system recited in claim 11, wherein each active tag indicator specifies a tag identifier, an event name that triggers execution of the associated computer programming code portion when the associated webpage is rendered, a variable or selector from which to collect data during execution of such associated computer programming code portion when the associated webpage is rendered, and a post-processing procedure, if any, for execution on the collected data.

20. One or more non-transitory computer readable media having instructions stored thereon for performing a method, the method comprising:

presenting a user interface on a display screen communicably coupled with a computing device that includes memory and a processor, the user interface displaying a graphical representation of a website that includes a plurality of webpages, the representation including a plurality of graphical webpage snapshots that each depicts a respective webpage associated with the website, the representation further including a plurality of graphical indicators that illustrate links between the plurality of webpages, the representation further including a plurality of active tag indicators that are each associated with a respective one of the webpages, each active tag indicator being associated with a respective portion of computer programming code that is configured to collect data from visitors to the associated webpage and included in the respective webpage with which the active tag indicator is associated, wherein the representation further includes a plurality of webpage analytics indicators that are each associated with a respective one of the webpages and are associated and selectable with at least one of the associated webpage'active indicators, each of the webpage analytics indicators, upon selection, describing one or more characteristics of web traffic associated with the respective webpage and it's at least one active tag indicator;

receiving user input indicating an editing action to be performed with respect to a first one of the computer programming code portions associated with a first one of the active tag indicators and its associated webpage and that will present an advertisement when the associated webpage in which the first computer programming code portion is included is loaded in a web browser, the editing action adding the first computer programming code portion to or removing the first computer programming code portion from the webpage, wherein the webpage analytics indicator that is associated with the first active tag indicator is configured to describe one or more characteristics of web traffic associated with the first active tag indicator based on traffic results obtained after the website is updated to reflect the editing action; and transmitting an update instruction message via a communications interface, the update instruction message including instructions for updating the website to reflect the editing action.

\* \* \* \* \*